United States Patent [19]

Marple

[11] Patent Number: 4,585,715

[45] Date of Patent: Apr. 29, 1986

[54] METAL CATHODE COLLECTOR HAVING A PROTECTIVE SURFACE LAYER OF A METAL OXIDE

[75] Inventor: Jack W. Marple, Elyria, Ohio

[73] Assignee: Union Carbide Corporation, Danbury, Conn.

[21] Appl. No.: 626,107

[22] Filed: Jun. 29, 1984

[51] Int. Cl.$^4$ .................. H01M 6/14; H01M 4/02
[52] U.S. Cl. ...................... 429/194; 429/209; 429/224
[58] Field of Search .............. 424/194, 224, 209

[56] References Cited

U.S. PATENT DOCUMENTS

| | | | |
|---|---|---|---|
| 3,749,607 | 7/1973 | Jasinski et al. | 429/194 |
| 3,953,235 | 4/1976 | Blomgren et al. | 429/224 X |
| 4,057,679 | 11/1977 | Dey | 429/194 |
| 4,328,288 | 5/1982 | Taylor | 429/194 X |
| 4,336,315 | 6/1982 | Eda | 429/194 |
| 4,379,817 | 4/1983 | Kozawa | 429/194 X |
| 4,465,747 | 8/1984 | Evans | 429/224 X |

FOREIGN PATENT DOCUMENTS 52-111625 9/1977 Japan.
55-150557 11/1980 Japan.

OTHER PUBLICATIONS

"Handbook of Stainless Steels" (Peckner and Bernstein, McGraw-Hill, p. 35-6).

Primary Examiner—Brian E. Hearn
Assistant Examiner—Stephen J. Kalafut
Attorney, Agent, or Firm—C. F. O'Brien

[57] ABSTRACT

An electrochemical cell employing a cathode electrode comprising an active cathode material such as $MnO_2$, deposited on and/or in contact with a metal cathode collector such as stainless steel, and wherein the metal cathode collector has a protective layer of an oxide of the metal of said cathode collector.

7 Claims, No Drawings

METAL CATHODE COLLECTOR HAVING A PROTECTIVE SURFACE LAYER OF A METAL OXIDE

FIELD OF THE INVENTION

The invention relates to an electrochemical cell comprising an active metal anode, a cathode electrode comprising a particulate active cathode material disposed on and/or in contact with a metal cathode collector, and an ionically conductive electrolyte solution containing a solute dissolved in a solvent, and wherein the improvement is that the cathode collector has a protective surface layer of an oxide of the metal of said cathode collector. The invention also relates to a method for producing a cathode electrode in which a particulate active cathode material is deposited on and secured to a metal cathode collector having a surface layer of an oxide of the metal of the cathode collector.

BACKGROUND OF THE ART

In galvanic cells, such as nonaqueous cells, the active cathode material in particulate form is generally mixed with a suitable binder and, if required, a conductive material and then deposited on a metal cathode collector to form a cathode electrode. In some cell systems, such as $Li/MnO_2$ and $Li/CF_x$ systems, the metal cathode collector is subject to corrosion particularly at the cathode potential. Such corrosion has been associated with deterioration in the open circuit voltage of the cell and deterioration in the discharge performance of the cells after storage, particularly at elevated temperatures. This problem of cathode collector corrosion is particularly noticeable in coiled or jellyroll type cell constructions due to the large surface area of the cathode collector.

Japanese Patent Application No. 52-111625 discloses the use of cathode collectors made from metals such as nickel, stainless steel, titanium or aluminum, which have a surface coating of $RuO_2$ formed by coating a Ru salt solution on the cathode collector and decomposing the salt to form a $RuO_2$ layer. This $RuO_2$ layer is stated as being corrosion resistant and conductive and therefore will serve as a protective coating for current collectors in cell systems such as lithium cell systems.

Japanese Patent Application No. 55-150557 discloses the use of an annealed metal substrate for thin cathode pellets to prevent cracking or distortion of the thin cathode pellets.

It is an object of the present invention to provide a cell employing among other components a cathode electrode composed of an active cathode material, preferably particulate, deposited on and/or in contact with a metal cathode collector and wherein the metal cathode collector has a protective layer of an oxide of the metal of said cathode collector to effectively prevent corrosion of the cathode collector during storage and discharge of the cell, particularly at the cathode potential.

Another object of the present invention is to provide a cathode electrode with a metal cathode collector, such as stainless steel, which has an oxide layer of the metal of the cathode collector on its surface to protect the cathode collector against corrosion when the electrode is assembled in a cell, such as a lithium cell.

Another object of the present invention is to provide a method for treating a metal cathode collector so that an oxide layer of the metal of the cathode collector is disposed on the surface of the cathode collector.

The foregoing and additional objects will become more fully apparent from the following description.

DISCLOSURE OF THE INVENTION

The invention relates to an electrochemical cell comprising an active metal anode, an active cathode material used in conjunction with a metal cathode collector, and an ionically conductive electrolyte solution containing a solute dissolved in the solvent, and wherein the improvement is that the metal cathode collector has a protective surface layer of an oxide of the metal of said cathode collector.

The invention also relates to a method for treating a metal cathode collector for use in conjunction with an active cathode material to produce a cathode electrode comprising the steps:

a. oxidizing the surface of a metal cathode collector so as to produce a protective surface layer on said cathode collector of an oxide of the metal of said cathode collector; and b. depositing and securing an active cathode material on the cathode collector to produce a cathode electrode.

The cathode collector for use in this invention can be a metal sheet, a metal screen, perforated metal, expanded metal or any metal component onto which the active cathode material of the cell is deposited and/or which contacts the active cathode material. The cathode collector can be in physical contact and/or electronic contact with the active cathode material. The metal component should be conductive and can be made from such materials as stainless steel, nickel, titanium, and aluminum. Preferably, the oxide layer should be sufficiently uniform to substantially cover the surface of the cathode collector. Preferably the oxide layer should be between about 500 and 5000 Å thick to insure protection against corrosion in most cell applications.

In a cell system such as $Li/MnO_2$ that uses a stainless steel cathode collector, species such as hydrogen and halogen ions are believed to be present in the cell that will attack and corrode the stainless steel cathode collector. According to the subject invention a means of avoiding or retarding this corrosion is to oxidize the cathode collector to form a protective layer of an oxide of the metal of the cathode collector on the surface such that the oxide layer is an oxygen-rich oxide layer. There are a number of processes that can be used to oxidize the surface of cathode collectors, such as stainless steel cathode collectors. Some examples are to treat the cathode collector with a strong acid such as $HNO_3$, treat the cathode collector at 200° to 900° C. in an oxidizing atmosphere such as air, and treat the cathode collector in a molten salt bath such as $NaNO_3$ at about 200° to about 450° C. for about 1 to about 10 minutes.

The Handbook of Stainless Steel (Peckner and Bernstein, McGraw-Hill p. 35–36), discloses the use of oxidizing molten salt baths for conditioning stainless steel prior to acid pickling. This disclosure is incorporated herein as if set out in full text. The preferred treatment would be the molten salt bath treatment in which a cathode collector, such as a stainless steel screen, is dipped into a 200° C. to 450° C. mixture of $NaNO_3$, $KNO_3$ and $LiNO_3$ for about 1 to 10 minutes. The hot nitrate salt will react with any lubricant present on the stainless steel surface and also convert complex oxides present to a controlled uniform oxide coating. An example of this reaction is:

$$2FeO + NaNO_3 \rightarrow Fe_2O_3 + NaNO_2$$

The resulting oxygen-rich oxide coating will have a layered structure in which $Fe_2O_3$ is formed on the outer surface followed by $Fe_3O_4$, then iron-chromium spinels. In this example, the stability of the coating is pH dependent since iron oxides are highly soluble in an acidic environment but are passive and stable in a basic environment. Consequently, it would be advantageous to add to the cathode mix an alkaline component of Ca(OH)$_2$ or the like in an amount of about 0.05 to 10 weight percent based on the weight of the dry cathode mix.

The stainless steel cathode collector could be oxidized in air at 850° C. to increase the chromium oxide or treated in nitrogen to increase its nitrogen content.

The metal oxide coated cathode collector of this invention is suitable for use in cells employing anodes such as lithium, calcium, magnesium, sodium and zinc and cathodes such as $MnO_2$, $CF_x$ where x is greater than 0 and less than 1.1, $C_2F$, CuO, $FeS_2$, AgO and $Ag_2O$. In a preferred embodiment of the invention, a coiled electrode construction would be employed. In a $MnO_2$ or $CF_x$/organic electrolyte/lithium cell, the lithium electrode could comprise a lithium strip which would be superimposed on a cathode electrode strip with a separator interposed between them and then helically wound to produce a coiled assembly.

When the active cathode material is particulate manganese dioxide then it may be preferable to incorporate an additive such as Ca(OH)$_2$, Mg(OH)$_2$, $MnCO_3$, $Li_2SiO_3$, or mixtures thereof to aid in suppressing or minimizing the increase in internal impedance of the cell which may occur during normal storage or discharge. An amount of the additive between about 0.05 and about 10 weight percent based on the dry weight of the cathode mix would be suitable with an amount about 0.1 and about 3 weight percent being preferable. It will be appreciated that the range of the additive will depend upon the type and grade of manganese dioxide employed.

When an $MnO_2$ cathode is intended for use in nonaqueous cell systems, the water inherently contained in both electrolytic and chemical types of manganese dioxide can be substantially removed by various treatments. For example, the manganese dioxide can be heated in air or an inert atmosphere at a temperature of 350° C. for about 8 hours or at a lower temperature for a longer period of time. Care should be taken to avoid heating the manganese dioxide above its decomposition temperature which is about 400° C. in air. In oxygen atmospheres, higher temperatures may be employed.

Preferably, the manganese dioxide should be heat-treated to remove its water content in the crystal lattice to below about 1 weight percent and then it can be mixed with a conductive agent such as graphite, carbon or the like and a binder such a Teflon (trademark for polytetrafluoroethylene), ethylene acrylic acid copolymer or the like to produce a solid cathode. If desired, a small amount of the electrolyte can be incorporated into the manganese dioxide mix.

An added possible benefit in the removal of substantially all the water from manganese dioxide is that if small amounts of water are present in the cell's electrolyte then the manganese dioxide will adsorb the main portion of that water from the electrolyte and thereby prevent or substantially delay the reaction of the water with the anode such as lithium. In this situation, the manganese dioxide will act as an extracting agent for the water impurities in the organic solvents.

Useful organic solvents employed alone or mixed with one or more other solvents for use in this invention include the following classes of compounds:
Alkylene nitriles: e.g., crotonitrile
  (liquid range, −51.1° C. to 120° C.)
Trialkyl borates: e.g., trimethyl borate, $(CH_3O)_3B$
  (liquid range, −29.3° to 67° C.)
Tetraalkyl silicates: e.g., tetramethyl silicate, $(CH_3O)_4Si$ (boiling point, 121° C.)
Nitroalkanes: e.g., nitromethane, $CH_3NO_2$
  (liquid range, −17° to 100.8° C.)
Alkylnitriles: e.g., acetonitrile, $CH_3CN$
  (liquid range, −45° to 81.6° C.)
Dialkylamides: e.g., dimethylformamide, $HCON(CH_3)_2$
  (liquid range, −60.48° to 149° C.)
Lactams: e.g., N-methylpyrrolidone,

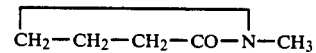

(liquid range, −16° to 202° C.)
Tetraalkylureas: e.g., tetramethylurea, $(CH_3)_2N—CO—N(CH_3)_2$
  (liquid range, −1.2° to 166° C.)
Monocarboxylic acid esters: e.g., ethyl acetate
  (liquid range, −83.6° to 77.06° C.)
Orthoesters: e.g., trimethylorthoformate, $HC(OCH_3)_3$
  (boiling point, 103° C.)
Lactones: e.g., β-butyrolactone,

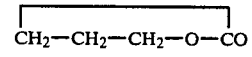

(liquid range, −42° to 206° C.)
Dialkyl carbonates: e.g., dimethyl carbonate, $OC(OCH_3)_2$
  (liquid range, −2° to 90° C.)
Alkylene carbonates: e.g., propylene carbonate,

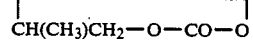

(liquid range, −48° to 242° C.)
Monoethers: e.g., diethyl ether
  (liquid range, −116° to 34.5° C.)
Polyethers: e.g., 1,1- and 1,2-dimethoxyethane
  (liquid ranges, −113.2° to 64.5° C. and −58° to 83° C., respectively)
Cyclic ethers: e.g., tetrahydofuran
  (liquid range, −65° to 67° C.); 1,3-dioxolane
  (liquid range, −95° to 78° C.)
Nitroaromatics: e.g., nitrobenzene
  (liquid range, 5.7° to 210° C.)
Aromatic carboxylic acid halides: e.g., benzoyl chloride
  (liquid range, 0° to 197° C.); benzoyl bromide
  (liquid range, −24° to 218° C.)
Aromatic sulfonic acid halides: e.g., benzene sulfonyl chloride
  (liquid range, 14.5° to 251° C.)

Aromatic phosphonic acid dihalides: e.g., benzene phosphonyl dichloride (boiling point, 258° C.)
Aromatic thiophosphonic acid dihalides: e.g., benzene thiophosphonyl dichloride (boiling point 124° C. at 5 mm)
Cyclic sulfones: e.g., sulfolane,

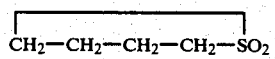

(melting point, 22° C.); 3-methylsulfolane (melting point, −1° C.)
Alkyl sulfonic acid halides: e.g., methanesulfonyl chloride
   (boiling point, 161° C.)
Alkyl carboxylic acid halides: e.g., acetyl chloride
   (liquid range, −112° to 50.9° C.); acetyl bromide
   (liquid range, −96° to 76° C.); propionyl chloride
   (liquid range, −94° to 80° C.)
Saturated heterocyclics: e.g., tetrahydrothiophene
   (liquid range, −96° to 121° C.);
   3-methyl-2-oxazolidone (melting point, 15.9° C.)
Dialkyl sulfamic acid halides: e.g., dimethyl sulfamyl chloride (boiling point, 80° C. at 16 mm)
Alkyl halosulfonates: e.g., ethyl chlorosulfonate
   (boiling point, 151° C.)
Unsaturated heterocyclic carboxylic acid halides:
   e.g., 2-furoyl chloride
      (liquid range, −2° to 173° C.)
Five-membered unsaturated heterocyclics: e.g.,
   3,5-dimethylisoxazole (boiling point, 140° C.); 1-methylpyrrole (boiling point, 114° C.); 2,4-dimethylthiazole (boiling point, 144° C.);
   furan (liquid range, −85.65° to 31.36° C.)
Esters and/or halides of dibasic carboxylic acids:
   e.g., ethyl oxalyl chloride (boiling point, 135° C.)
Mixed alkyl sulfonic acid halides and carboxylic acid halides:
   e.g., chlorosulfonyl acetyl chloride
      (boiling point, 98° C. at 10 mm)
Dialkyl sulfoxides: e.g., dimethyl sulfoxide
   (liquid range, 18.4° to 189° C.)
Dialkyl sulfates: e.g., dimethylsulfate
   (liquid range, −31.75° to 188.5° C.)
Dialkyl sulfites: e.g., dimethylsulfite
   (boiling point, 126° C.)
Alkylene sulfites: e.g., ethylene glycol sulfite
   (liquid range, −11° to 173° C.)
Halogenated alkanes: e.g., methylene chloride
   (liquid range, −95° to 40° C.);
   1,3-dichloropropane
   (liquid range, −99.5° to 120.4° C.)

The preferred solvents are sulfolane; tetrahydrofuran; methyl-substituted tetrahydrofuran; 1,3-dioxolane; 3-methyl-2-oxazolidone; propylene carbonate; γ-butyrolactone; ethylene glycol sulfite; dimethylsulfite; dimethyl sulfoxide; and 1,1- and 1,2-dimethoxyethane. Of the preferred solvents, the best are sulfolane; 3-methyl-2-oxazolidone; propylene carbonate; 1,1- and 1,2-dimethoxyethane, and 1,3-dioxolane because they appear more chemically inert to battery components and have wide liquid ranges, and especially because they permit highly efficient utilization of the cathode materials.

Low viscosity cosolvents which can be used include tetrahydrofuran (THF), methyl-substituted tetrahydrofuran (Met-THF), dioxolane (DIOX), dimethoxyethane (DME), ethylene glycol sulfite (EGS), dioxane, dimethylsulfite (DMS) or the like. Specifically, the total amount of the low viscosity cosolvent added could be between about 20% and about 80% based on total solvent volume, i.e., exclusive of solute, so as to lower the viscosity to a level suitable for use in a high drain cell.

The ionizing solute for use in the invention may be a simple or double salt or mixtures thereof, for example, $LiCF_3SO_3$, $LiBF_4$ and $LiClO_4$ which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226—July/December, 1983, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

EXAMPLE 1

Coiled cells were made using a lithium anode, a cathode electrode composed of a mix of 88 percent by weight $MnO_2$, 8 percent by weight graphite, 3 percent polytetrafluoroethylene and 1 percent $Ca(OH)_2$, and an electrolyte consisting of 50 volume percent dimethoxyethane (DME) and 50 volume percent propylene carbonate (PC) containing 1M $LiCF_3SO_3$. The cathode mix was placed on a 304L stainless steel cathode collector. In some cells the stainless steel cathode collector was either heated in air at about 350° C. for 25 minutes or oxidized in a molten $NaNO_3$—$KNO_3$—$LiNO_3$ bath at 400° C. for three (3) minutes and in some cells the 1 percent $Ca(OH)_2$ was not added. Several samples of each cell lot were then tested for open circuit voltage (OCV) and closed circuit voltage across a 25-ohm load (CCV). The impedance (IMP) of each cell was measured at 1 KHz. The average data for each cell lot obtained are shown in Table I. Cells from each cell lot (2 cells per lot) were then discharged continuously across a 60-ohm load until a 1.8-volt cutoff and the data obtained are shown in Table II. The data shown in Tables I and II confirm that, when using a stainless steel cathode collector, a basic additive such as $Ca(OH)_2$ should be incorporated to provide a basic environment for the oxide layer. In the data shown in Table II, cell lot 6 was superior after being stored for 80 days at 60° C., compared to the other cell lots.

TABLE I

| LOT NO. | $Ca(OH)_2$ | Collector Treatment | Initial | | | 20 Days* | | | 40 Days* | | |
|---|---|---|---|---|---|---|---|---|---|---|---|
| | | | OCV (Volts) | CCV (Volts) | MP (OHMS) | OCV (Volts) | CCV (Volts) | IMP (OHMS) | OCV (Volts) | CCV (Volts) | IMP (OHMS) |
| 1 | No | None | 3.47 | 2.93 | 2.8 | 3.15 | 2.81 | 3.7 | 3.09 | 2.42 | 3.9 |
| 2 | Yes | None | 3.44 | 2.92 | 2.0 | 3.33 | 2.44 | 4.1 | 3.11 | 2.11 | 4.2 |
| 3 | No | Air oxidized | 3.48 | 2.96 | 2.3 | 3.10 | 2.69 | 3.6 | 3.04 | 2.58 | 3.1 |
| 4 | Yes | Air oxidized | 3.47 | 2.79 | 4.0 | 3.32 | 2.45 | 4.5 | 3.27 | 2.19 | 4.4 |
| 5 | No | Oxidized in $NaNO_3$—$KNO_3$—$LiNO_3$ | 3.51 | 3.07 | 2.4 | 3.08 | 2.71 | 4.0 | 3.08 | 2.57 | 3.3 |
| 6 | Yes | Oxidized in $NaNO_3$—$KNO_3$—$LiNO_3$ | 3.45 | 2.92 | 1.9 | 3.32 | 2.40 | 3.6 | 3.30 | 2.26 | 3.39 |

| LOT NO. | $Ca(OH)_2$ | Collector Treatment | 60 Days* | | | 80 Days* | | |
|---|---|---|---|---|---|---|---|---|
| | | | OCV (Volts) | CCV (Volts) | IMP (OHMS) | OCV (Volts) | CCV (Volts) | IMP (OHMS) |
| 1 | No | None | 2.84 | 1.95 | 7.4 | 2.81 | 1.21 | 24.8 |
| 2 | Yes | None | 2.97 | 2.27 | 3.7 | 2.95 | 1.75 | 6.6 |
| 3 | No | Air oxidized | 2.79 | 1.47 | 6.7 | 2.72 | 1.08 | 10.0 |
| 4 | Yes | Air oxidized | 2.92 | 2.07 | 4.4 | 3.02 | 2.35 | 4.2 |
| 5 | No | Oxidized in $NaNO_3$—$KNO_3$—$LiNO_3$ | 2.72 | 1.62 | 5.9 | 2.88 | 1.70 | 6.8 |
| 6 | Yes | Oxidized in $NaNO_3$—$KNO_3$—$LiNO_3$ | 3.30 | 1.96 | 4.9 | 3.22 | 2.01 | 5.6 |

TABLE II

Hours to 1.8-Volt Cutoff

| LOT NO. | Initial | Avg | 20* | Avg | 40* | Avg | 60* | Avg | 80* | Avg |
|---|---|---|---|---|---|---|---|---|---|---|
| 1 | 30.7 27.0 | 28.9 | 28.4 27.3 | 27.9 | 24.4 9.1 | 16.8 | 23.0 0 | 11.5 | 19.4 0 | 9.7 |
| 2 | 34.2 26.9 | 30.6 | 26.2 24.9 | 25.6 | 24.6 18.1 | 21.4 | 30.8 15.3 | 23.1 | 18.0 16.6 | 17.3 |
| 3 | 32.2 30.6 | 31.4 | N.T. | | 11.2 9.5 | 10.4 | 19.0 0 | 10.0 | 14.9 0 | 7.5 |
| 4 | 32.9 27.2 | 30.1 | N.T. | | 28.1 23.8 | 26.0 | 25.6 2.0 | 13.8 | 13.4 12.4 | 12.9 |
| 5 | 29.4 28.9 | 29.2 | N.T. | | 25.7 0 | 12.9 | 0 0 | 0 | 15.8 1.5 | 8.7 |
| 6 | 29.9 29.6 | 29.8 | N.T. | | 27.4 27.0 | 27.2 | 29.3 28.5 | 28.9 | 29.9 27.7 | 28.8 |

*Days stored at 60° C. before being discharged.
N.T. = Not Tested

What is claimed is:

1. In an electrochemical cell comprising an active anode, an active cathode material used in conjunction with a metal cathode collector, and an ionically conductive electrolyte solution containing a solute dissolved in a solvent; the improvement wherein the metal cathode collector is selected from the group consisting of stainless steel and nickel and has a surface layer of at least 500 Å thick of an oxide of a metal of said metal cathode collector and wherein said metal cathode collector having the protective surface layer exhibits a lower resistance in the electrochemical cell than would a similar metal cathode collector not having the protective surface layer.

2. The electrochemical cell of claim 1 wherein the active metal anode is selected from the group consisting of lithium, calcium, magnesium, sodium and zinc, and the active cathode material is selected from the group consisting of $MnO_2$, $CF_x$ where x is greater than 0 and less than 1.1, $C_2F$, $CuO$, $FeS_2$, $AgO$ and $Ag_2O$.

3. The electrochemical cell of claim 1 wherein the metal cathode collector is stainless steel, the anode is lithium and the active cathode material is $MnO_2$.

4. The electrochemical cell of claim 1 wherein the metal cathode collector is stainless steel, the anode is lithium and the active cathode material is $CF_x$.

5. The electrochemical cell of claim 1 wherein the active cathode material is in a particulate form and wherein a binder and conductive material are used with said cathode material.

6. The electrochemical cell of claim 5 wherein an additive selected from the group consisting of $Ca(OH)_2$, $Mg(OH)_2$, $MnCO_3$, and $Li_2SiO_3$ is used with the active cathode material.

7. The electrochemical cell of claim 6 wherein the additive is $Ca(OH)_2$.

* * * * *